US012288488B2

(12) United States Patent
Park et al.

(10) Patent No.: US 12,288,488 B2
(45) Date of Patent: Apr. 29, 2025

(54) DISPLAY APPARATUS

(71) Applicant: SAMSUNG ELECTRONICS CO., LTD., Suwon-si (KR)

(72) Inventors: Sangjun Park, Suwon-si (KR); Huulam Vuong Nguyen, Suwon-si (KR); Kwangsung Hwang, Suwon-si (KR); Yoonah Kim, Suwon-si (KR); Doyun Baek, Suwon-si (KR); Wookjin Lee, Suwon-si (KR); Jin Jung, Suwon-si (KR); Yoseob Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 171 days.

(21) Appl. No.: 18/106,841

(22) Filed: Feb. 7, 2023

(65) Prior Publication Data

US 2023/0186797 A1 Jun. 15, 2023

Related U.S. Application Data

(63) Continuation of application No. PCT/KR2022/013878, filed on Sep. 16, 2022.

(30) Foreign Application Priority Data

Dec. 15, 2021 (KR) ........................ 10-2021-0180170

(51) Int. Cl.
*G09F 9/302* (2006.01)
*G09F 9/33* (2006.01)

(52) U.S. Cl.
CPC .............. *G09F 9/3026* (2013.01); *G09F 9/33* (2013.01)

(58) Field of Classification Search
CPC .......... G09F 9/3026; G09F 9/33; G09F 9/302; G09F 9/3023
See application file for complete search history.

(56) References Cited

U.S. PATENT DOCUMENTS 10,522,519 B2 12/2019 Ryu et al.
10,635,381 B2 4/2020 Nakano
(Continued)

FOREIGN PATENT DOCUMENTS

EP 2 709 086 A2 3/2014
EP 3 059 725 A1 8/2016
(Continued)

OTHER PUBLICATIONS

International Search Report issued Dec. 13, 2022 by the International Searching Authority in International Application No. PCT/KR2022/013878.
(Continued)

*Primary Examiner* — Anthony M Haughton
*Assistant Examiner* — Hung Q Dang
(74) *Attorney, Agent, or Firm* — Sughrue Mion, PLLC

(57) ABSTRACT

A display apparatus includes a frame, a display panel configured to be detachable from the frame, and a position adjustment device provided between the frame and the display panel. The position adjustment device includes a first position adjusting member configured to adjust a position of the display panel in a first direction moving vertically with respect to the frame, and a second position adjusting member configured to adjust the position of the display panel in a second direction moving horizontally with respect to the frame.

18 Claims, 9 Drawing Sheets

(56) References Cited

U.S. PATENT DOCUMENTS

| | | | | |
|---|---|---|---|---|
| 11,140,467 | B2 | 10/2021 | Choi et al. | |
| 11,353,732 | B2 | 6/2022 | Yoon et al. | |
| 11,470,731 | B1 * | 10/2022 | Hochman | H05K 5/0021 |
| 12,038,123 | B2 * | 7/2024 | Wang | F16C 11/12 |
| 2016/0210886 | A1 * | 7/2016 | Brashnyk | F16B 5/02 |

FOREIGN PATENT DOCUMENTS

| | | | |
|---|---|---|---|
| JP | 2012-37569 | A | 2/2012 |
| JP | 5910160 | B2 | 4/2016 |
| JP | 6707191 | B2 | 6/2020 |
| KR | 10-1003753 | B1 | 12/2010 |
| KR | 10-1043987 | B1 | 6/2011 |
| KR | 1020140058853 | A | 5/2014 |
| KR | 101705511 | B1 | 3/2017 |
| KR | 101827877 | B1 | 2/2018 |
| KR | 1020200073600 | A | 6/2020 |
| KR | 102133914 | B1 | 7/2020 |
| KR | 102208816 | B1 | 1/2021 |
| KR | 1020210028844 | A | 3/2021 |
| KR | 102270484 | B1 | 6/2021 |
| KR | 1020210084822 | A | 7/2021 |

OTHER PUBLICATIONS

Written Opinion issued Dec. 12, 2022 by the International Searching Authority in International Application No. PCT/KR2022/013878.

Communication dated Oct. 31, 2024, issued by the European Patent Office in European Application No. 22907627.8.

* cited by examiner

DISPLAY APPARATUS

CROSS-REFERENCE TO RELATED APPLICATION(S)

This application is a bypass continuation of International Application No. PCT/KR2022/013878, filed on Sep. 16, 2022, in the Korean Intellectual Property Receiving Office, which is based on and claims priority to Korean Patent Application No. 10-2021-0180170, filed on Dec. 15, 2021, in the Korean Intellectual Property Office, the disclosures of which are incorporated herein by reference in their entireties.

BACKGROUND

1. Field

The disclosure relates to a display apparatus, and more particularly to a display apparatus capable of adjusting a position of a panel.

2. Description of Related Art

Recently, demand for high brightness, high resolution, large-scaled, high efficiency, low energy, and the like of display apparatuses is growing continuously, and there is a trend of actively researching new products to substitute or complement liquid crystal display (LCD) panels and organic light emitting diode (OLED) panels.

Among the trend, a modular display apparatus may be a display apparatus with a large-scale screen that consecutively tilts a plurality of panels.

However, the modular display apparatus as described above may include problems such as image quality deterioration and differences occurring in gaps and stepped-levels between the modules (i.e., panels).

SUMMARY

Provided is a display apparatus capable of finely adjusting a position of a panel.

Additional aspects will be set forth in part in the description which follows and, in part, will be apparent from the description, or may be learned by practice of the presented embodiments.

According to an aspect of the disclosure, a display apparatus may include a frame, a display panel configured to be detachable from the frame, and a position adjustment device provided between the frame and the display panel. The position adjustment device may include a first position adjusting member configured to adjust a position of the display panel in a first direction moving vertically with respect to the frame, and a second position adjusting member configured to adjust the position of the display panel in a second direction moving horizontally with respect to the frame.

The first position adjusting member may be provided adjacent to an upper end of a rear surface of the display panel.

The first position adjusting member may include a first bracket fixed to the display panel, a first fixing member fixed to the frame, and a first adjustment bolt fastened to the first bracket and the first fixing member, and configured to adjust the position of the display panel in the first direction by rotating in a clockwise direction or an anti-clockwise direction.

The first adjustment bolt may be thread coupled to a fastening hole of the first bracket through a through hole of the first fixing member.

The first position adjusting member may include a plurality of first position adjusting members, and the plurality of first position adjusting members may be configured to adjust the frame of the display panel such that the frame of the display panel is tiltable.

The second position adjusting member may be provided adjacent to a side end of a rear surface of the display panel.

The second position adjusting member may include a second bracket fixed to the display panel, a second fixing member fixed to the frame, and a second adjustment bolt configured to contact one surface of the second bracket, and adjust the position of the display panel in the second direction by rotating in a clockwise direction or an anti-clockwise direction.

The second adjustment bolt may be configured to contact the one surface of the second bracket through a through hole of the second fixing member.

The second position adjusting member may include a plurality of second position adjusting members, and the plurality of second position adjusting members may be configured to adjust the frame of the display panel such that the frame of the display panel is tiltable.

The frame may include a first coupling member provided at a front surface of the frame, the display panel may include a second coupling member provided at a rear surface of the display panel, and the display panel may be configured to be detachable from the frame by an attractive force generated between the first coupling member and the second coupling member.

According to an aspect of the disclosure, a position adjustment device provided between a frame and a display panel may include a first position adjusting member configured to adjust a position of the display panel in a first direction moving vertically with respect to the frame, and a second position adjusting member configured to adjust the position of the display panel in a second direction moving horizontally with respect to the frame.

The first position adjusting member may be provided adjacent to an upper end of a rear surface of the display panel.

The first position adjusting member may include a first bracket fixed to the display panel, a first fixing member fixed to the frame, and a first adjustment bolt fastened to the first bracket and the first fixing member, and configured to adjust the position of the display panel in the first direction by rotating in a clockwise direction or an anti-clockwise direction.

The first adjustment bolt may be thread coupled to a fastening hole of the first bracket through a through hole of the first fixing member.

The first position adjusting member may include a plurality of first position adjusting members, and the plurality of first position adjusting members may be configured to adjust the frame of the display panel such that the frame of the display panel is tiltable

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Embodiments described herein are provided as examples to assist in the comprehensive understanding of the disclosure, and it is to be understood that the disclosure may be variously modified and embodied differently from the embodiments described herein. However, in case it is determined that in describing the embodiments, detailed description of related known technologies or elements may unnecessarily confuse the gist of the disclosure, the detailed description and specific illustration thereof will be omitted. In addition, the accompanied drawings may be shown with measurements of some elements exaggerated in size rather than shown in actual scale to assist in the understanding of the disclosure.

Terms used in describing the various embodiments and full scope of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected. In this case, the meaning of the term may be interpreted as defined in the description, or may be interpreted based on the overall context of the disclosure and the technical common sense according to the related art, unless otherwise defined. Accordingly, the terms used herein are not to be understood simply as its designation but based on the meaning of the term and the overall context of the disclosure.

In the disclosure, expressions such as “comprise,” “may comprise,” “include,” “may include,” or the like are used to designate a presence of a corresponding characteristic (e.g., elements such as numerical value, function, operation, or component, etc.), and not to preclude a presence or a possibility of additional characteristics.

Further, in the disclosure, because elements necessary to describing respective embodiments are described, the disclosure is not necessarily limited thereto. Accordingly, some elements may be modified or omitted, and other elements may be added. In addition, elements may be distributed and disposed in different independent devices from one another.

Furthermore, although the embodiments herein are described in great detail below with reference to the accompanying drawings and the descriptions describing the accompanying drawings, the disclosure is not limited by the embodiments.

The disclosure will be described in greater detail below with reference to the accompanied drawings.

Figure 1:
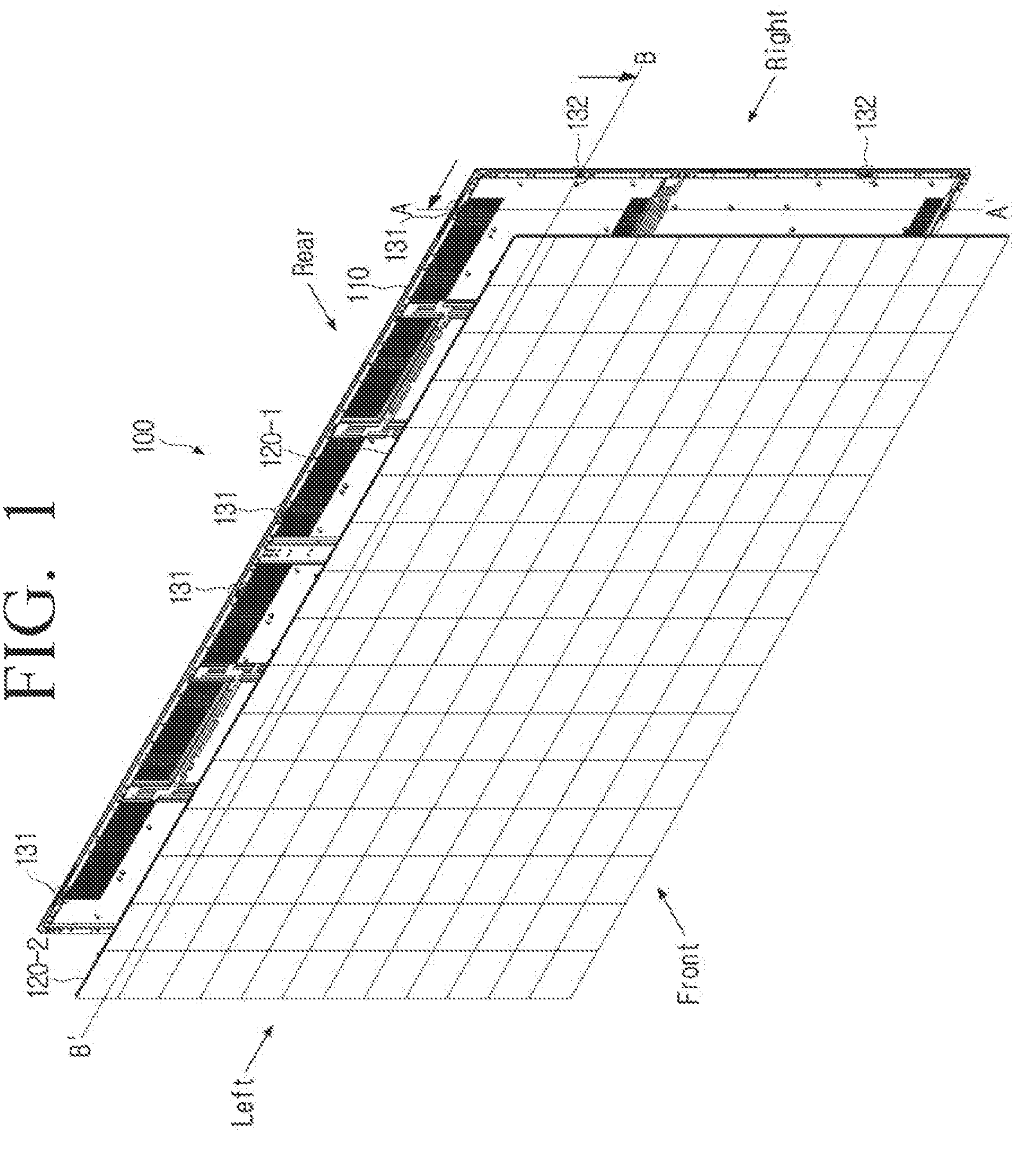
FIG. 1 is a perspective view of a display apparatus according to an embodiment.

FIG. 1 is a perspective view of a display apparatus according to an embodiment.

Referring to FIG. 1, the display apparatus 100 according to an embodiment may include a frame 110, a display panel 120, and a position adjustment device disposed between the frame 110 and the display panel 120.

The display apparatus 100 according to an embodiment may be configured with a plurality of display panels 120-1, . . . , **120-*n* (for a display apparatus with n display panels). The display apparatus 100 may display a video signal. The display apparatus 100 may be implemented as a television (TV), but is not limited thereto, and may be applicable to any device so long as a display function is provided such as, for example, and without limitation, a video wall, a large format display (LFD), a digital signage, a digital information display, and the like. In addition, the display apparatus 100** may be implemented as a display of various forms such as, for example, and without limitation, a liquid crystal display (LCD), an organic light-emitting diode (OLED), a liquid crystal on silicon (LCoS), a digital light processing (DLP), a quantum dot (QD) display panel, a quantum dot light-emitting diodes (QLED), and the like.

According to an embodiment, the display apparatus 100 may be implemented to a form including the plurality of display panels (or, cabinets) 120-1, . . . , **120-*n*. For example, as illustrated in FIG. 1, a first display panel 120-1 and a second display panel 120-2 may be coupled implementing one display apparatus 100. The respective display panels 120-1, . . . , 120-*n*** according to an embodiment may include a plurality of self-light emitting devices. Here, the self-light emitting device may be at least one of a light emitting diode (LED) or a micro LED.

In addition, the respective display panels 120-1, . . . , **120-*n*** may be implemented as an LED cabinet including a plurality of LED devices. Here, the LED device may be implemented as a red, green and blue (RGB) LED, and the RGB LED may include a red LED, a green LED, and a blue LED. In addition, the LED device may additionally include a white LED in addition to the RGB LED. The LED device according to an embodiment may be implemented as a micro LED. Here, the micro LED may be an LED of about 5-100 micrometer size, and may be an ultra-small light emitting device that emits light on its own without a color filter.

Referring to FIG. 1, the display apparatus 100 may include a frame 110, the frame 100 may support the display panel 120, and the display panel 120 may be implement as a screen of the display apparatus 100.

The frame 100 according to an embodiment may have a rough rectangular shape, and may include a frame body covering a rear direction of the display panel 120 and a frame cover surrounding an edge part of the frame body. Here, the frame cover may form an upper surface exterior, a lower surface exterior, and a side surface exterior of the display apparatus 100.

The frame 110 according to an embodiment may include a device dash board, and the device dash board may include a switching mode power supply (SMPS) provided to supply power necessary in an operation of the display apparatus 100. The device dash board may include a printed circuit board (PCB) for controlling an image being displayed in the display panel 120, and include a signal processing board for data processing.

According to an embodiment, a rear surface of the display panel 120 may be attached to or detached from a front surface of the frame 110 by magnetic force. For example, a plurality of first coupling members disposed at the front surface of the frame 110 and a plurality of second coupling members disposed at the rear surface (or, back surface) of the display panel 120 may be inter-coupled to be attachable or detachable by an attractive force. The detailed description on the above will be described below with reference to FIG. 9.

Referring to FIG. 1, the display apparatus 100 according to an embodiment may include at least one position adjustment device. Here, the position adjustment device may be disposed between the frame 110 and the display part 120.

For example, based on the display apparatus 100 including the first display panel 120-1 and the second display panel 120-2, the display apparatus 100 may include at least one position adjustment device for adjusting a position of the first display panel 120-1 in between the frame 110 and the first display panel 120-1. In another example, the display apparatus 100 may include at least one position adjustment device for adjusting a position of the second display panel 120-2 in between the frame 110 and the second display panel 120-2.

Here, the position adjustment device may include a first position adjusting member 131 for adjusting the position of the display panel 120 in a first direction moving vertically with respect to the frame 110 and a second position adjusting member 132 for adjusting the position of the display panel 120 in a second direction moving horizontally with respect to the frame 110.

According to an embodiment, the display panel 120 may be configured such that the first position adjusting member for moving the display panel 120 to an upper side or a lower side direction with respect to the frame 110 is disposed to be adjacent to an upper end of the back surface of the display panel 120 and an upper end of the front surface of the frame 110.

Referring to FIG. 1, the frame 110 may include the first position adjusting member 131 for moving the first display panel 120-1 to the upper end of the front surface of the frame 110 in the upper side or the lower side direction.

In another example, the frame 110 may include the first position adjusting member 131 for moving the second display panel 120-2 to the upper end of the front surface of the frame 110 in the upper side or the lower side direction.

Accordingly, the respective first position adjusting members 131 disposed to be adjacent to the upper end of the back surface of the display panel 120 and the upper end of the front surface of the frame 110 may be disposed spaced apart by a predetermined distance.

According to an embodiment, the second position adjusting member 132 for moving the display panel 120 according to an embodiment to a left side or a right side direction with respect to the frame 110 may be disposed to be adjacent to a side end of the back surface of the display panel 120 and a side end of the front surface of the frame 110.

Referring to FIG. 1, the frame 110 may include the second position adjusting member 132 for moving the first display panel 120-1 to a right side end of the front surface of the frame 110 in the left side or the right side direction.

In another example, the frame 110 may include the second position adjusting member 132 for moving the second display panel 120-2 to a left side end of the front surface of the frame 110 in the left side or the right side direction.

Accordingly, the respective second position adjusting members 132 disposed to be adjacent to the side end of the back surface of the display panel 120 and the side end of the front surface of the frame 110 may be disposed spaced apart by a predetermined distance.

The first position adjusting member 131 will be described below first with reference to the drawings, and the second position adjusting member 132 will be described following thereafter.

Figure 2:
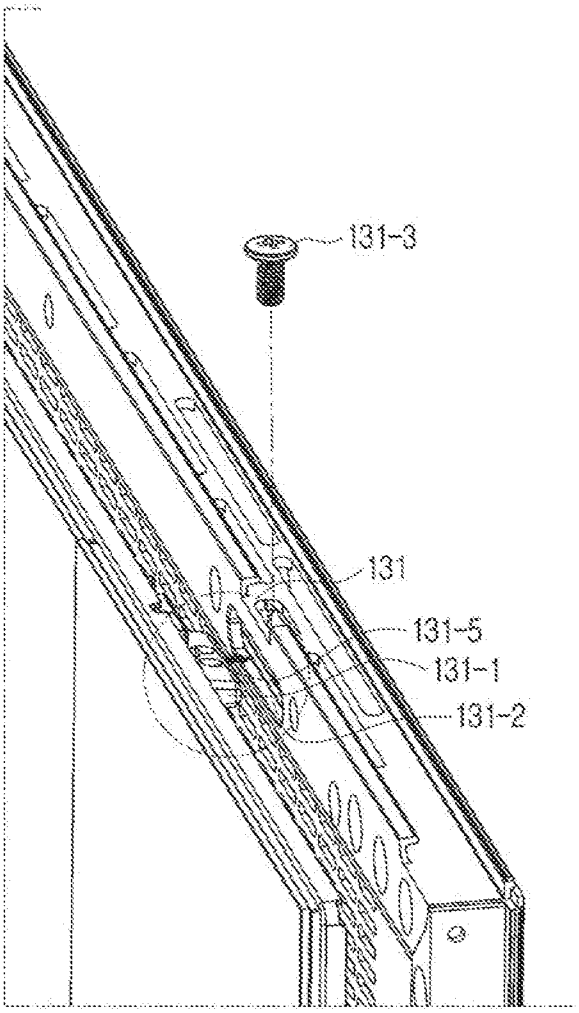
FIG. 2 is a perspective view illustrating a first position adjusting member according to an embodiment.

FIG. 2 is a perspective view illustrating the first position adjusting member according to an embodiment.

Referring to FIG. 2, the first position adjusting member 131 may include a first bracket 131-1, a first fixing member 131-2, and a first adjustment bolt 131-3.

Here, the first bracket 131-1 may be fixed to the display panel 120, and specifically, disposed to be adjacent to the upper end of the back surface of the display panel 120.

The first fixing member 131-2 according to an embodiment may be disposed to be adjacent to the upper end of the front surface of the frame 110, and may include a hole through which a part of the first bracket 131-1 is inserted.

For example, the first fixing member 131-2 may include a space (e.g., hole) capable of receiving a protrusion part of the first bracket 131-1.

According to an embodiment, the first position adjusting member 131 may include the first adjustment bolt 131-3, and the first adjustment bolt 131-3 may be fastened to the first bracket 131-1 and the first fixing member 131-2 after a part (e.g., protrusion part) of the first bracket 131-1 is inserted in the first fixing member 131-2. Here, the first adjustment bolt 131-3 may be implemented as a threaded member.

According to an embodiment, the first adjustment bolt 131-3 may adjust the position of the display panel 120 by moving the display panel 120 to the upper side or the lower side rotating in a clockwise direction or an anti-clockwise direction.

According to an embodiment, a state in which the first adjustment bolt 131-3 is fastened to the first bracket 131-1 and the first fixing member 131-2 will be described with reference to FIG. 3.

Figure 3:
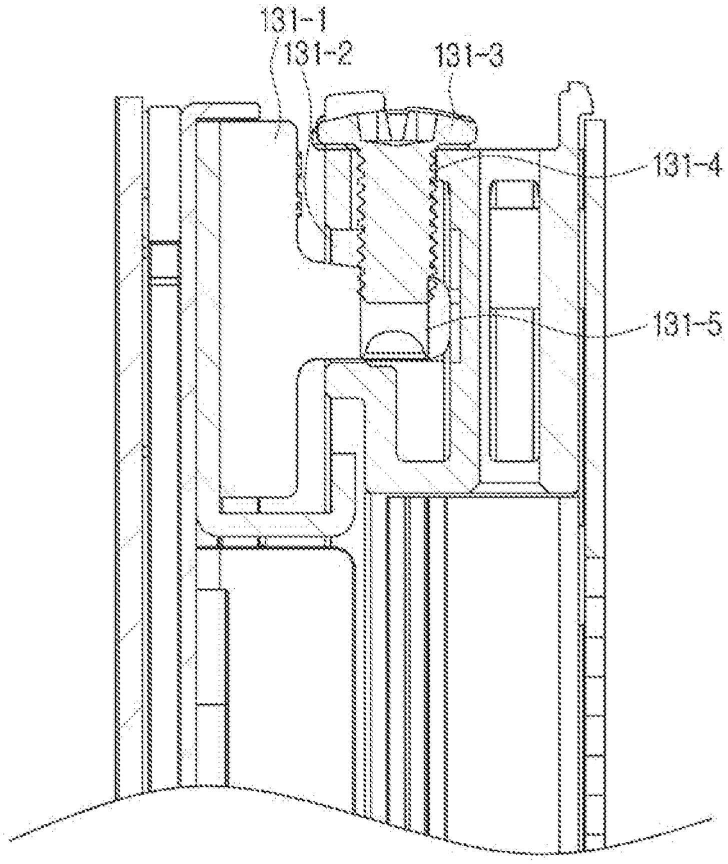
FIG. 3 is a cross-sectional view illustrating a first position adjusting member according to an embodiment.

FIG. 3 is a cross-sectional view illustrating the first position adjusting member according to an embodiment. FIG. 3 is a cross-sectional view of the display apparatus 100 taken along line A-A' illustrated in FIG. 1

Referring to FIG. 3, the first position adjusting member 131 may include the first bracket 131-1, the first fixing member 131-2, and the first adjustment bolt 131-3, and specifically, the first adjustment bolt 131-3 may be thread coupled to a fastening hole 131-5 of the first bracket 131-1 through a through hole 131-4 of the first fixing member 131-2.

Here, the through hole 131-4 may be a hole communicating the first fixing member 131-2 with the outside.

According to an embodiment, by adjusting a depth of thread coupling the first adjustment bolt 131-3 with the fastening hole 131-5 of the first bracket 131-1 by rotating the first adjustment bolt 131-3 in the clockwise direction or the anti-clockwise direction, the plurality of first coupling members disposed at the front surface of the frame 110 and the plurality of second coupling members disposed at the rear surface (or, back surface) of the display panel 120 may adjust the position of the first direction with respect to the frame 110 of the display panel 120 which is attached and supported by attractive force.

For example, the depth of thread coupling the first adjustment bolt 131-3 with the fastening hole 131-5 may be adjusted by rotating the first adjustment bolt 131-3. By rotating the first adjustment bolt 131-3 in the clockwise direction or the anti-clockwise direction, the display panel 120 may be moved minutely in an upper direction or a lower direction with respect to the frame 110.

Figure 4:
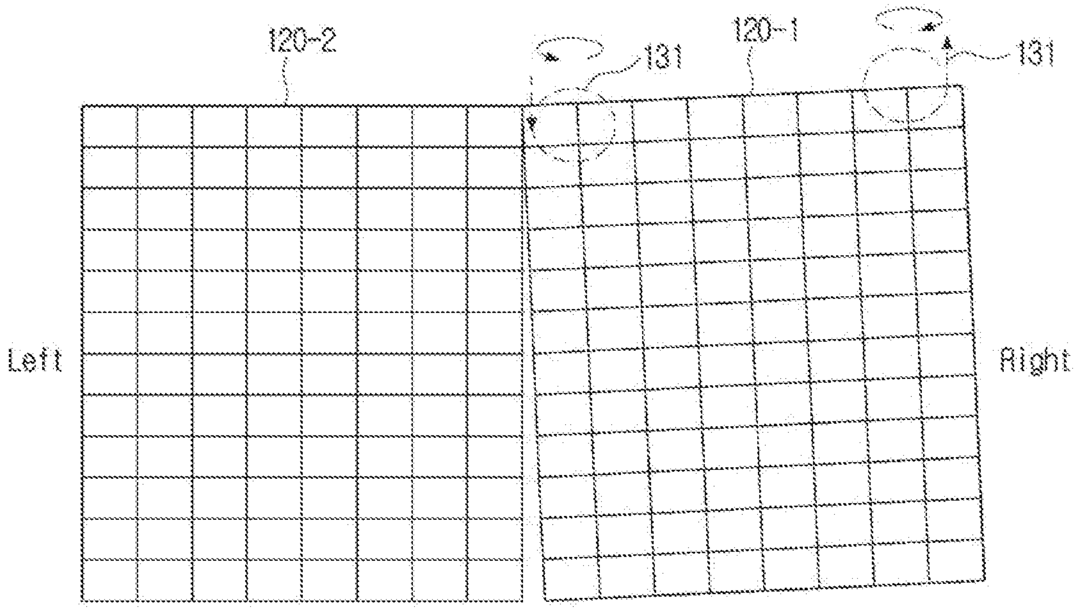
FIG. 4 is a front view illustrating a structure in which a position of a display apparatus is adjusted according to an embodiment.

FIG. 4 is a front view illustrating a structure in which a position of the display apparatus is adjusted according to an embodiment.

Referring to FIG. 4, based on there being a difference in the position of the upper direction or the lower direction in between the first display panel 120-1 and the second display panel 120-2 which form the display apparatus 100, the position of the upper direction or the lower direction of the first display panel 120-1 and the second display panel 120-2 may be adjusted respectively by using the first position adjusting member 131 because there is the problem of a distorted image or an image with a difference present being provided to a user.

For example, as illustrated in FIG. 4, the display apparatus 100 may be fixed to a wall by a wall mounted unit, or installed indoors or outdoors in a method which is supported by a stand. In this case, a portion of the plurality of display panels forming the display apparatus 100 may be level with a bottom, the remaining display panels may not be level with the bottom even though a gradient is 0 (e.g., a state which is not tilted), or the gradient may not be 0.

Based on a gradient degree of the respective display panels being different, an interval may occur in between the plurality of display panels as illustrated in FIG. 4, and the user viewing the image displayed by the display apparatus 100 may experience a difference.

Accordingly, according to an embodiment, the interval in between the plurality of display panels may be minimized by appropriately rotating the first adjustment bolt 131-3 provided in the respective first position adjusting members 131 provided in the display apparatus 100 in the clockwise direction or the anti-clockwise direction.

For example, when the first adjustment bolt 131-3 is rotated in the clockwise direction by one revolution, the first display panel 120-1 which is thread coupled to the fastening hole 131-5 of the first bracket 131-1 may be moved in the upper direction by about 0.5 mm. In another example, when the first adjustment bolt 131-3 is rotated in the anti-clockwise direction by one revolution, the first display panel 120-1 which is thread coupled to the fastening hole 131-5 of the first bracket 131-1 may be moved in the lower direction by about 0.5 mm. Here, specific numerals such as 0.5 mm are merely one example, and the embodiment is not limited thereto. For example, a moving distance in the upper direction or a moving distance in the lower direction of the display panel 120 when rotating in the clockwise direction or the anti-clockwise direction by one revolution may be varied according to a pitch of a thread crest formed in the fastening hole 131-5.

That is, the display panel 120 may be moved minutely in the upper direction by rotating the first adjustment bolt 131-3 in the clockwise direction, or the display panel 120 may be moved minutely in the lower direction by rotating the first adjustment bolt 131-3 in the anti-clockwise direction.

An interval space present between the other display panels 120' which are disposed adjacent to the display panel 120 may be minimized by appropriately rotating some of the first adjustment bolts 131-3 of the plurality of first fixing members 131-2 disposed between the upper end of the front surface of the frame 110 and the upper end of the back surface of the display panel 120 in the clockwise direction or the anti-clockwise direction.

Figure 5:
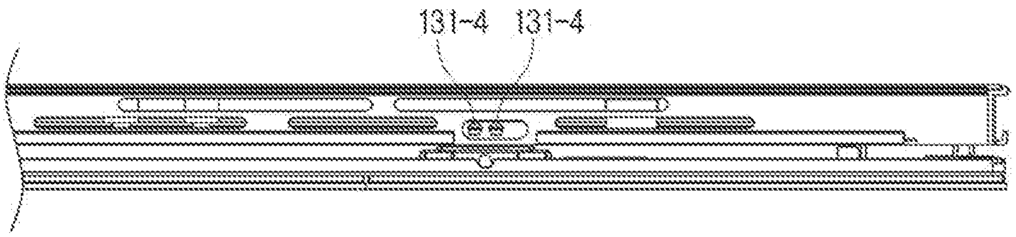
FIG. 5 is a plane view illustrating a through hole of a fixing member according to an embodiment.

FIG. 5 is a plane view illustrating a through hole of a fixing member according to an embodiment.

Referring to FIG. 5, according to an embodiment, the first position adjusting member 131 may include at least two through holes 131-4 communicating the first fixing member 131-2 with the outside.

The first adjustment bolt 131-3 may be thread coupled to the fastening hole 131-5 of the first bracket 131-1 through any one of the at least two through holes 131-4.

The first bracket 131-1 may also include at least two fastening holes 131-5, and the at least two fastening holes 131-5 may correspond to different fastening holes 131-5 from one another.

According to an embodiment, any one of the at least two first position adjusting members 131 may be disposed adjacent to an upper left end of the back surface of the display panel 120, and the other may be disposed adjacent to an upper right end of the back surface of the display panel 120.

Figure 6:
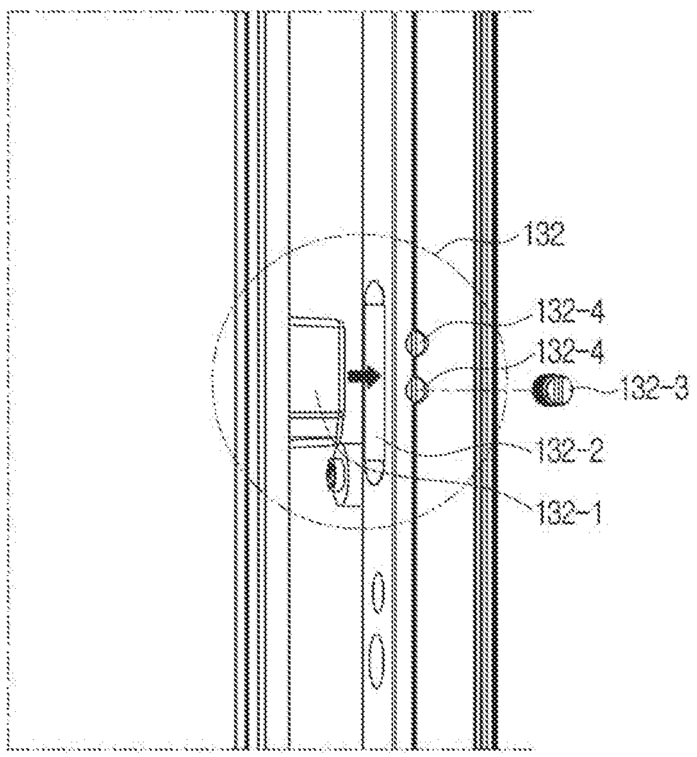
FIG. 6 is a perspective view illustrating a second position adjusting member according to an embodiment.

FIG. 6 is a perspective view illustrating the second position adjusting member according to an embodiment.

Referring to FIG. 6, the second position adjusting member 132 may include a second bracket 132-1, a second fixing member 132-2, and a second adjustment bolt 132-3.

Here, the second bracket 132-1 may be fixed to the display panel 120, and specifically, disposed adjacent to the side end of the back surface of the display panel 120.

The second fixing member 132-2 according to an embodiment may be disposed adjacent to the side end of the front surface of the frame 110, and include a hole through which a part of the second bracket 132-1 is inserted. For example, the second fixing member 132-2 may include a space (e.g., hole) capable of receiving a protrusion part of the second bracket 132-1.

According to an embodiment, the second position adjusting member 132 may include the second adjustment bolt 132-3, and the second adjustment bolt 132-3 may be fastened to the second fixing member 132-2 after a part (e.g., protrusion part) of the second bracket 132-1 is inserted in the second fixing member 132-2.

Here, the second adjustment bolt 132-3 may be configured to directly contact one surface of the second bracket 132-1 through a through hole 132-4 of the second fixing member 132-2. The one surface of the second bracket 132-1 may be a surface to be pressed which receives pressure by the second adjustment bolt 132-3.

According to an embodiment, the second adjustment bolt 132-3 may rotate in the clockwise direction or the anti-clockwise direction, and the display panel 120 may move to the left side based on pressure applied to the one surface of the second bracket 132-1 increasing due to the second adjustment bolt 132-3 rotating in the clockwise direction.

In another example, based on the pressure applied to the one surface of the second bracket 132-1 decreasing due to the second adjustment bolt 132-3 rotating in the anti-clockwise direction, the display panel 120 may stop or move to the right side. The second adjustment bolt 132-3 may be implemented as a threaded member, and for example, may be implemented as a non-head bolt.

The above-described example is based on assuming that the second position adjusting member 132 is disposed adjacent to the right side end of the display apparatus 100, and a left side movement or a right side movement of the display panel 120 according to a clockwise or an anti-clockwise rotation of the second adjustment bolt 132-3 when the second position adjusting member 132 is disposed adjacent to the left side end of the display apparatus 100 may be different from the above-described example.

According to an embodiment, a state in which the second adjustment bolt 132-3 is fastened to the second fixing member 132-2, and configured to directly contact the one surface of the second bracket 132-1 through the through hole 132-4 of the second fixing member 132-2 will be described with reference to FIG. 7.

Figure 7:
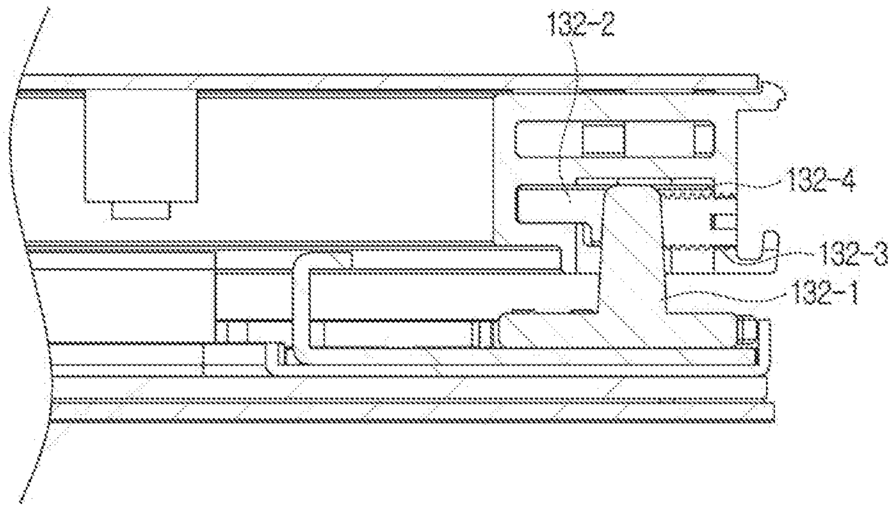
FIG. 7 is a cross-sectional view illustrating a second position adjusting member according to an embodiment.

FIG. 7 is a cross-sectional view illustrating the second position adjusting member according to an embodiment. FIG. 7 is a cross-sectional view of the display apparatus 100 taken along line B-B' illustrated in FIG. 1

Referring to FIG. 7, the second position adjusting member 132 may include the second bracket 132-1, the second fixing member 132-2, and the second adjustment bolt 132-3, and specifically, the second adjustment bolt 132-3 may be configured to directly contact the one surface (e.g., protrusion part) of the second bracket 132-1 through the through hole 132-4 of the second fixing member 132-2. Here, the through hole 132-4 of the second fixing member 132-2 may be a hole communicating the second fixing member 132-2 with the outside.

The second bracket 132-1 may not include a fastening hole (a hole corresponding to the fastening hole 131-5 of the first bracket 131-1) to the protrusion part unlike the first bracket 131-1.

According to an embodiment, by adjusting the pressure on the one surface of the second bracket 132-1 of the second adjustment bolt 132-3 by rotating the second adjustment bolt 132-3 in the clockwise direction or the anti-clockwise direction, the plurality of first coupling members disposed at the front surface of the frame 110 and the plurality of second coupling members disposed at the rear surface (or, back surface) of the display panel 120 may adjust a position of a second direction with respect to the frame 110 of the display panel 120 which is attached and supported by attractive force.

For example, by increasing or decreasing the pressure on the one surface of the second bracket 132-1 by rotating the second adjustment bolt 132-3 in the clockwise direction or the anti-clockwise direction, the display panel 120 may be moved minutely to the left side or the right side with respect to the frame 110.

Figure 8:
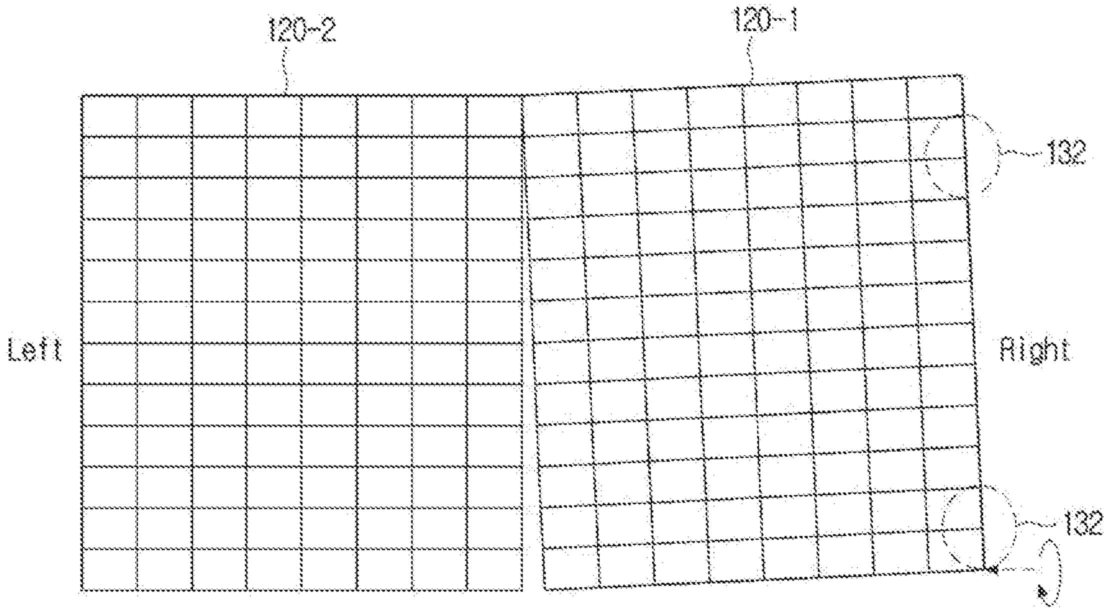
FIG. 8 is a front view illustrating a structure in which a position of a display apparatus is adjusted according to an embodiment.

FIG. 8 is a front view illustrating a structure in which a position of a display apparatus is adjusted according to an embodiment.

Referring to FIG. 8, based on there being a different in the gradient degree between the first display panel 120-1 and the second display panel 120-2 which form the display apparatus 100, because there is the problem of a distorted image or an image with a difference present being provided to the user, the gradient degree of the first display panel 120-1 and the second display panel 120-2 may be adjusted respectively by using the second position adjusting member 132.

As described above, the display apparatus 100 may be fixed to a wall by a wall mounted unit, or installed indoors or outdoors in a method which is supported by a stand. In this case, the portion of the plurality of display panels forming the display apparatus 100 may be level with the bottom, the remaining display panels may not be level with the bottom even though the gradient is 0 (e.g., a state which is not tilted), or the gradient may not be 0.

Based on the gradient degree of the respective display panels being different, an interval may occur in between the plurality of display panels as illustrated in FIG. 8, and the user viewing the image displayed by the display apparatus 100 may experience a difference.

Accordingly, according to an embodiment, the interval in between the plurality of display panels may be minimized by appropriately rotating the second adjustment bolt 132-3 provided in the respective second position adjusting members 132 provided in the display apparatus 100 in the clockwise direction or the anti-clockwise direction.

For example, when the second adjustment bolt 132-3 is rotated in the clockwise direction by one revolution, the pressure applied to the one surface of the protrusion part of the second bracket 132-1 may increase, and first display panel 120-1 may be moved to the left side by about 0.5 mm. Here, specific numerals such as 0.5 mm are merely one example, and the embodiment is not limited thereto.

That is, the display panel 120 may be moved minutely to the left side by rotating the second adjustment bolt 132-3 in the clockwise direction, or the display panel 120 may be moved minutely to the right side or stopped by rotating in the anti-clockwise direction.

Different from the above-described example, based on the second position adjusting member 132 being disposed adjacent to the left side end of the display apparatus 100, the display panel 120 may be moved minutely to the right side by rotating the second adjustment bolt 132-3 in the clockwise direction, or the display panel 120 may be moved minutely to the left side or stopped by rotating the second adjustment bolt 132-3 in the anti-clockwise direction.

Accordingly, the interval space present between the other display panels 120' which are disposed adjacent to the display panel 120 may be minimized by appropriately rotating the second adjustment bolt 132-3 in the clockwise direction or the anti-clockwise direction.

Referring back to FIG. 6, according to an embodiment, the second position adjusting member 132 may include at least two through holes 131-4 communicating the second fixing member 132-2 with the outside.

The second adjustment bolt 132-3 may be configured to directly contact with the one surface of the second bracket 132-1 through any one of the at least two through holes 132-4.

According to an embodiment, any one of the at least two second position adjusting members 132 may be disposed adjacent to an upper side end of the back surface of the display panel 120, and the other may be disposed adjacent to a lower side end of the back surface of the display panel 120.

Figure 9:
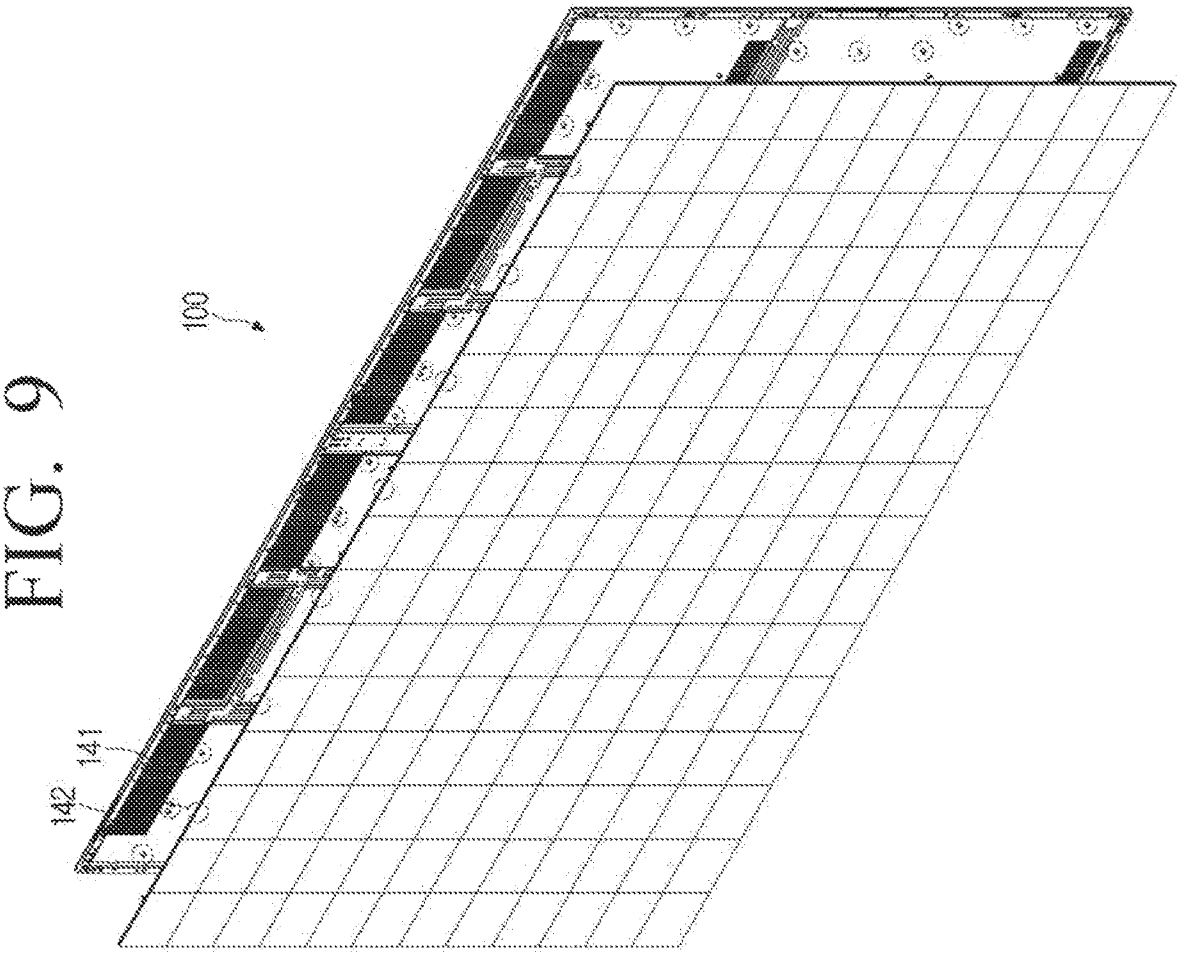
FIG. 9 is a perspective view illustrating a coupling member according to an embodiment.

FIG. 9 is a perspective view illustrating a coupling member according to an embodiment.

According to an embodiment, the rear surface of the display panel 120 may be attached to or detached from the front surface of the frame 110 by magnetic force. For example, the plurality of first coupling members 141 disposed at the front surface of the frame 110 and the plurality of second coupling members 142 disposed at the rear surface (or, back surface) of the display panel 120 may be intercoupled to be attachable or detachable by attractive force.

While the disclosure has been illustrated and described with reference to example embodiments thereof, it will be understood that the embodiments are intended to be illustrative, not limiting. It will be understood by those skilled in the art that various changes in form and details may be made therein without departing from the true spirit and full scope of the disclosure, including the appended claims and their equivalents.

What is claimed is:

1. A display apparatus comprising:

a frame;

a display panel configured to be detachable from the frame; and a position adjustment device provided between the frame and the display panel, wherein the position adjustment device comprises:

a first position adjusting member configured to adjust a position of the display panel in a first direction moving vertically with respect to the frame; and a second position adjusting member configured to adjust the position of the display panel in a second direction moving horizontally with respect to the frame, and wherein the first position adjusting member comprises:

a first bracket fixed to the display panel;

a first fixing member fixed to the frame; and a first adjustment bolt thread coupled to a fastening hole of the first bracket through a through hole of the first fixing member.

2. The display apparatus of claim 1, wherein the first position adjusting member is provided adjacent to an upper end of a rear surface of the display panel.

3. The display apparatus of claim 2, wherein the first adjustment bolt is configured to adjust the position of the display panel in the first direction by rotating in a clockwise direction or an anti-clockwise direction.

4. The display apparatus of claim 3, wherein the first position adjusting member comprises a plurality of first position adjusting members, and wherein the plurality of first position adjusting members are configured to adjust the frame of the display panel such that the frame of the display panel is tiltable.

5. The display apparatus of claim 1, wherein the second position adjusting member is provided adjacent to a side end of a rear surface of the display panel.

6. The display apparatus of claim 5, wherein the second position adjusting member comprises:

a second bracket fixed to the display panel;

a second fixing member fixed to the frame; and a second adjustment bolt contacting one surface of the second bracket, and configured to adjust the position of the display panel in the second direction by rotating in a clockwise direction or an anti-clockwise direction.

7. The display apparatus of claim 6, wherein the second adjustment bolt contacts the one surface of the second bracket through a through hole of the second fixing member.

8. The display apparatus of claim 6, wherein the second position adjusting member comprises a plurality of second position adjusting members, and wherein the plurality of second position adjusting members are configured to adjust the frame of the display panel such that the frame of the display panel is tiltable.

9. The display apparatus of claim 1, wherein the frame comprises a first coupling member provided at a front surface of the frame, wherein the display panel comprises a second coupling member provided at a rear surface of the display panel, and wherein the display panel is configured to be detachable from the frame by an attractive force generated between the first coupling member and the second coupling member.

10. A position adjustment device provided between a frame and a display panel, the position adjustment device comprising:

a first position adjusting member configured to adjust a position of the display panel in a first direction moving vertically with respect to the frame; and a second position adjusting member configured to adjust the position of the display panel in a second direction moving horizontally with respect to the frame, wherein the first position adjusting member comprises:

a first bracket fixed to the display panel;

a first fixing member fixed to the frame; and a first adjustment bolt thread coupled to a fastening hole of the first bracket through a through hole of the first fixing member.

11. The position adjustment device of claim 10, wherein the first position adjusting member is provided adjacent to an upper end of a rear surface of the display panel.

12. The position adjustment device of claim 11, wherein the first adjustment bolt is configured to adjust the position of the display panel in the first direction by rotating in a clockwise direction or an anti-clockwise direction.

13. The position adjustment device of claim 12, wherein the first position adjusting member comprises a plurality of first position adjusting members, and wherein the plurality of first position adjusting members are configured to adjust the frame of the display panel such that the frame of the display panel is tiltable.

14. The position adjustment device of claim 10, wherein the second position adjusting member is provided adjacent to a side end of a rear surface of the display panel.

15. The position adjustment device of claim 14, wherein the second position adjusting member comprises:

a second bracket fixed to the display panel;

a second fixing member fixed to the frame; and a second adjustment bolt contacting one surface of the second bracket, and configured to adjust the position of the display panel in the second direction by rotating in a clockwise direction or an anti-clockwise direction.

16. The position adjustment device of claim 15, wherein the second adjustment bolt contacts the one surface of the second bracket through a through hole of the second fixing member.

17. The position adjustment device of claim 15, wherein the second position adjusting member comprises a plurality of second position adjusting members, and wherein the plurality of second position adjusting members are configured to adjust the frame of the display panel such that the frame of the display panel is tiltable.

18. The position adjustment device of claim 10, wherein the frame comprises a first coupling member provided at a front surface of the frame, wherein the display panel comprises a second coupling member provided at a rear surface of the display panel, and wherein the display panel is configured to be detachable from the frame by an attractive force generated between the first coupling member and the second coupling member.

* * * * *